O. F. REICH.

PILLOW.

APPLICATION FILED AUG. 6, 1906.

Reissued May 4, 1909. 12,952.

Witnesses

V. L. Sherman

George L. Chindahl

Inventor

Otto F. Reich

By Luther L. Miller

Atty.

THE NORRIS PETERS CO., WASHINGTON, D. C.

BEST AVAILABLE COPY

UNITED STATES PATENT OFFICE.

OTTO F. REICH, OF RIVERDALE, ILLINOIS.

PILLOW.

No. 12,952. Specification of Reissued Letters Patent. Reissued May 4, 1909.

Original No. 808,217, dated December 26, 1905, Serial No. 249,990. Application for reissue filed August 6, 1906. Serial No. 329,507.

*To all whom it may concern:*

Be it known that I, OTTO F. REICH, a citizen of the United States, residing at Riverdale, in the county of Cook and State of Illinois, have invented new and useful Improvements in Pillows, of which the following is a specification.

The object of this invention is the production of a substitute for the common feather pillow, which shall do away with the defects and disadvantages of feather pillows, and which shall be cool, light, and sanitary.

Figure 1:
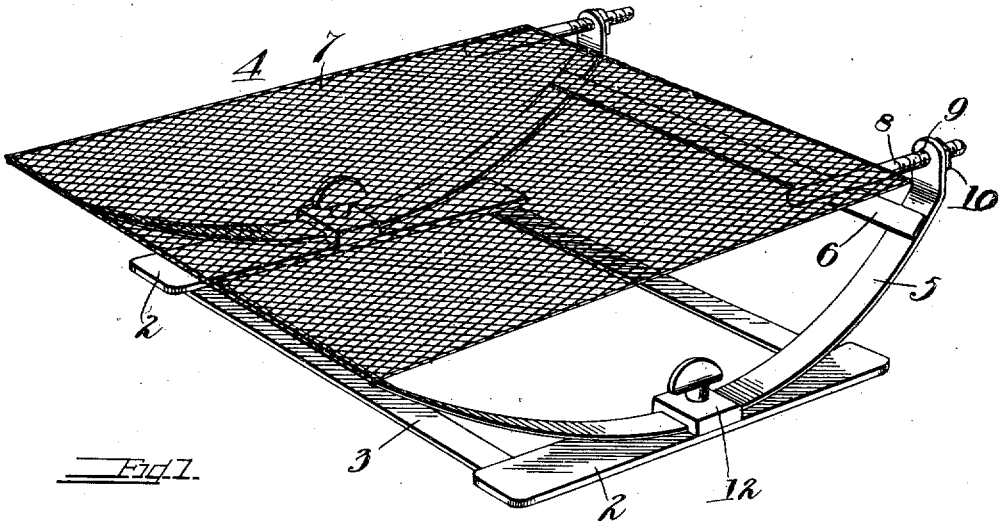
Figure 2:
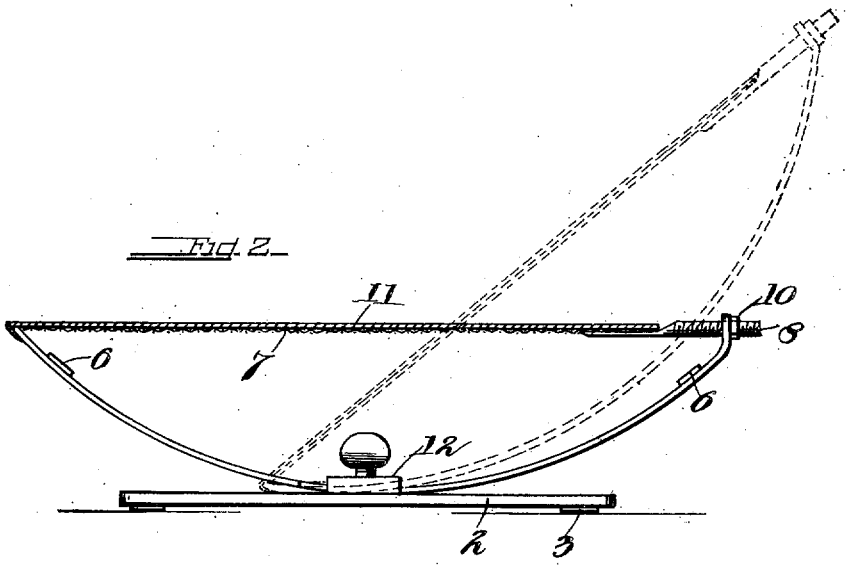

In the accompanying drawings Figure 1 is a perspective view of a pillow embodying the features of my invention. Fig. 2 is an end elevation thereof.

The embodiment herein shown of my invention comprises a base frame 1 formed of the two end bars 2 and the longitudinal bars 3, said base frame preferably being formed of metal, and intended to be placed upon the bed-bottom or mattress. To the base frame 1 is adjustably secured a spring pillow-frame 4 comprising the bowed spring side-pieces 5 secured together by means of the longitudinal cross-pieces 6. A substantially rectangular top 7 of woven wire or other similar material is secured, in this instance, at two of its corners to one end of each of the spring side pieces 6, the opposite corners of said top being adjustably secured to the opposite ends of said side pieces by means of screws 8 attached to said top and extending through openings 9 in said side pieces, nuts 10 being turned upon said screws and bearing upon said side pieces for placing tension upon said top. If desired, a thin pad 11 may be placed upon the elastic top 7 and secured in place in any suitable manner.

The means alluded to for adjustably securing the pillow frame 4 to the base frame 1 comprises loops 12 secured to the end bars 2, through which loops the side pieces 5 of the pillow frame 4 extend. A set screw 13 passing through each of the loops 12 is adapted to clamp the side piece 5 against the adjacent end bar 2 to hold the pillow frame 4 at any desired angle.

The adjustable connection between the base frame 1 and the pillow frame 4 permits said pillow frame to be moved back and forth on the base frame and to be tilted to various angles as indicated in dotted lines in Fig. 2. This angular adjustment is important and advantageous, providing either a low pillow or a high pillow, or allowing the pillow frame to be brought to a nearly vertical position, if desired, for use as a backrest when sitting up in bed. However, it is apparent that the base frame 1 may be dispensed with and the pillow frame 4 set directly upon the bed at any desired angle of inclination. The screws 8 for placing tension upon the elastic top 7 also may be dispensed with, the tension of the side pieces 5 being depended upon for maintaining said top under suitable tension.

Various other changes in the construction and arrangement of the parts of the present embodiment may be made without departing from the spirit of the invention. I, therefore, desire not to limit myself to the precise details hereinbefore set forth.

It will be observed that by reason of the construction above described the upper ends of each of the side members are unconnected except by the flexible top piece whereby said upper elastic portions are free to yield transversely, that is, forwardly and backwardly or toward each other. This capacity to yield forwardly and backwardly together with the yielding capacity of the top piece gives a practically universal yielding capacity and therefore affords an extremely comfortable headrest which will relieve all strains upon the neck of the user. It will be observed also that the center from which the curvature of the springs is struck is located considerably above the top piece. This is especially advantageous when the pillow is to be used without a base frame or other means for locking it in its forwardly tilted position, in which case the weight of the head of the user alone is relied upon to hold the pillow in its adjusted position while at the same time permitting a slight rocking movement to enable it to adjust itself to the changes in the position of the user. In other words the spring rockers are required, especially when used without a base frame, to have a more or less flat curvature in order that the frame may be held in its tilted position without strain or attention on the part of the user. When a base frame is employed in combination with locking means, this flat curvature of the side springs would appear to be not so essential although even in that case it is greatly advantageous in that it provides for a maximum of head-resting space with a given height of pillow.

I claim as my invention:

1. In a pillow, in combination, a pillow frame adapted to be supported upon the bed, and comprising two substantially parallel spring side bars secured together, said side bars being curved on the arc of a circle; an elastic top secured at one edge to said pillow frame; screws attached to the opposite edge of said top and passing through a portion of said pillow frame; and nuts on said screws for changing the relation between said screws and said pillow frame.

2. In a pillow, in combination, a base-frame, a spring-frame having downwardly-bowed side bars, a top of woven wire stretched between the ends of the side bars, and clamps connecting the base-frame and said side bars and permitting adjustment to vary the inclination of the spring-frame.

3. In a device of the character described, the combination with a skeleton base frame, of a pair of bowed spring side members adjustably connected to tilt upon the base frame, a flexible cover connected to the ends of said bowed members, and means for varying the tension of said cover.

OTTO F. REICH.

Witnesses:

C. PAUL PARKER,
GEORGE L. CHINDAHL.